Jan. 13, 1931.   M. E. CHANDLER   1,788,943
SHOCK ABSORBER
Filed April 16, 1927   6 Sheets-Sheet 1

Jan. 13, 1931.  M. E. CHANDLER  1,788,943
SHOCK ABSORBER
Filed April 16, 1927  6 Sheets-Sheet 3

Jan. 13, 1931. M. E. CHANDLER 1,788,943
SHOCK ABSORBER
Filed April 16, 1927     6 Sheets-Sheet 4

Witness
Harry R. White

Inventor
Milton E. Chandler.
By Brown, Boettcher & Dienner
Attys

Jan. 13, 1931. M. E. CHANDLER 1,788,943
SHOCK ABSORBER
Filed April 16, 1927 6 Sheets-Sheet 6

Patented Jan. 13, 1931

1,788,943

UNITED STATES PATENT OFFICE

MILTON E. CHANDLER, OF CHICAGO, ILLINOIS, ASSIGNOR TO STROMBERG RESEARCH CORPORATION, OF CHICAGO, ILLINOIS, A CORPORATION OF ILLINOIS

SHOCK ABSORBER

Application filed April 16, 1927. Serial No. 184,298.

My invention relates to shock absorbers, and more particularly to the proportional control type disclosed in Veitch Patent 910,974. In this type the friction opposed to spring recoil, i. e., of the automobile springs, is throughout the range of operation, substantially proportional to spring deflection. This is secured in the preferred embodiment of my invention and in common with the aforesaid Veitch patent, by the use of a stationary drum mounted on the frame of the vehicle and a pull strap wrapped peripherally about the drum to a variable extent in accordance with the spring deflection by means of a spring take-up mechanism disposed within the drum. Preferably a friction band or shoe lies under the strap to sustain the wear which would otherwise come upon the strap.

This take-up mechanism within the drum should be closed against the entrance of moisture and dirt and should be kept in well lubricated condition. In the preferred form of my invention I secure this result by means of a cover plate closing the open side of the drum. The connection between the spring inside the drum and pull strap is made by means of a pair of arms, one lying inside the cover and the drums and connected to the active end of the spring, and the other lying outside the cover and connected to the end of the pull strap. These two arms are connected together at their hubs and have a bearing upon a common trunnion.

It is desirable to have a firm bearing for the spring take-up mechanism and to subject said bearing to as little wear or stress as possible. In the preferred form of my invention I arrange these two arms directly in line with each other and mount the connected hubs upon a central stud or pin so that the bearing will be subjected to minimum twisting action. In this manner the outer arm which secures a support or bearing upon the outside periphery of the drum tends to guide or support the inner arm with minimum stress and wear upon the bearing.

It is desirable to provide means for adjusting the tension of the spring and in the preferred form of my invention I provide a sleeve between the pin and the hubs and to this sleeve the anchor end of the spring is attached. The sleeve extends out beyond the hub of the outer arm and is provided with a suitable adjusting head and lock to facilitate turning of the sleeve to adjust the tension of the spring and locking the sleeve to the pin.

To secure maximum space efficiency the diameter of the drum should be made as large as possible and with minimum diameter of the outer case. At the same time it is desirable to secure the full effect of the entire friction band and strap, i. e., to permit them throughout their full working length to float in and out radially as freely as possible. In the preferred embodiment I provide a terminal clip on the friction band which holds the ends of the band together and to the outer arm permitting at the same time a free radial floating action of the band. The strap is provided with a metal hook which hooks it to the arm and to the terminal clip on the friction band.

The parts throughout are designed for right or left assembly so that a minimum number of manufactured parts and a minimum number of pieces of stock are required.

When the device is assembled the spring is put under the proper tension and the parts are then locked by the insertion of a pin which extends through a hole in the cover or shell. After the device is applied to an automobile and the strap is clamped to the axle, the pin is withdrawn and the hole in the cover is closed by a plate which serves at the same time as a lock washer for the nut which holds the cover or case in place.

There are numerous other features of novelty which will be apparent from the following detailed description of a specific embodiment of my invention.

Now in order to acquaint those skilled in the art with the manner of constructing and operating a device embodying my invention, I shall describe in connection with the accompanying drawings a specific embodiment of the same.

Figures 1, 2, 21:
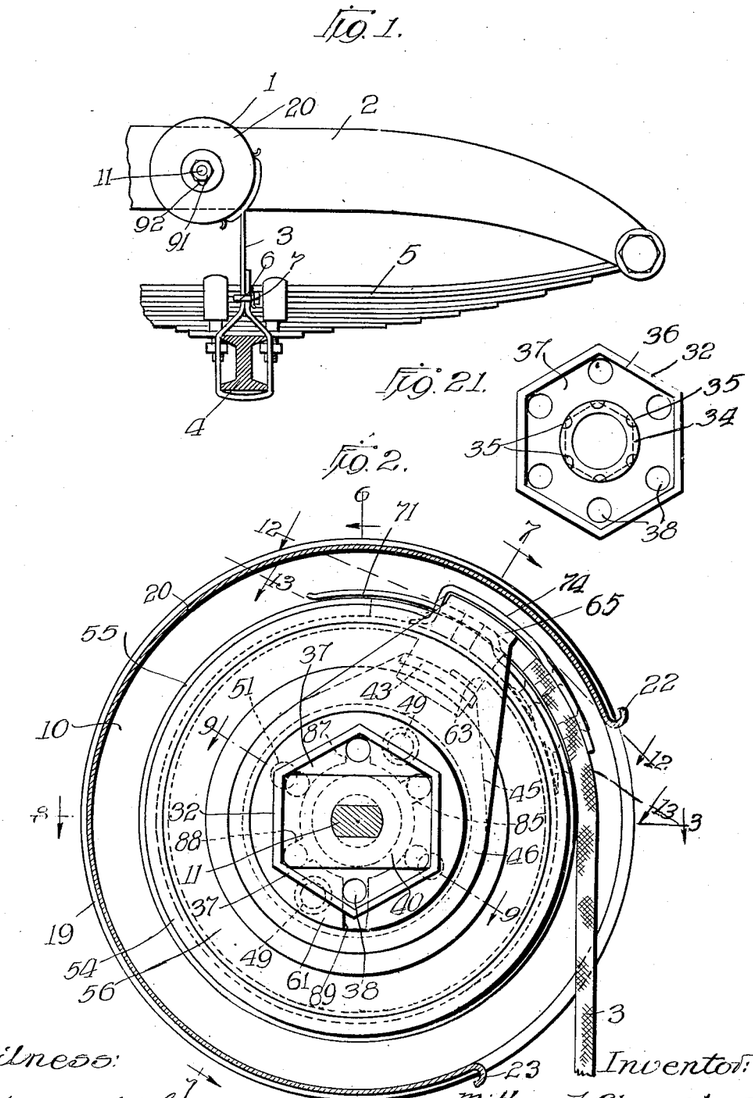
Fig. 1 is a side elevational view of the device of my invention applied to the frame, spring and axle of a vehicle.
Fig. 2 is a front elevational view of the device of my invention, the cover being shown in section, this view being taken on the section line 2—2 of Fig. 6.
Fig. 21 is a front elevation of the adjustable spring anchor sleeve.

Fig. 1 illustrates the mode of application of my device to the vehicle, the shock absorber 1 being mounted on the frame 2 of the vehicle, and the pull strap 3 being connected to the axle 4, this axle being in turn connected to the frame 2 through the medium of the spring 5.

The strap 3 is preferably a cotton fabric strap, the end of which is extended around the axle and clamped to the body of the strap by means of the U-bolt 6 and clamping plate 6'. Obviously, the strap may be secured to a suitable eye or pin which is connected to the axle in any suitable manner.

The shock absorber of my invention comprises essentially a drum which is formed of a stamping, this drum 7 comprising the cylindrical portion 8 (see Fig. 18) and the head or end wall 9. The end wall 9 is secured to a base plate 10, which base plate is likewise formed of a metal stamping. The base plate 10 and the drum 7 are secured together by a stud 11, the inner end of which is slabbed off and passed through an oblong hole in the end wall 9 of the drum 7 and in the central part of the base plate 10, and there the end of the stud is riveted over, as indicated at 12, so as to join the pin or stud 11 firmly to the drum and to the base plate. The base plate and drum are further secured together, preferably by spot welding, as at 13—13 in Fig. 18.

The base plate 10 has a pair of oblong openings formed therethrough and the head or end wall 9 of the drum has a pair of bosses pressed down and extending through the openings in the base plate 10, these bosses being hollow and being perforated to pass the shanks 15—15 of attaching bolts 16—16. The heads of these bolts are formed with square or oblong heads 17—17 (see Fig. 8) so that the drum and base plate, which constitute a frame, may be clamped to the vehicle frame 2 or to a mounting plate for the same, or other bracket if desired.

The base plate 10 has a pair of hollow bosses 18—18 struck outwardly, the bottoms of these bosses being in the same plane as the bottoms of the bosses 14—14 as serving as supporting surfaces against the frame 2 or other mounting to which the device may be secured. Obviously, instead of the bolts 16—16, rivets may be employed where the device is to be mounted on a plate or bracket in the course of manufacture.

The base plate 10 has a flange 19 extending around approximately three-quarters of the circumference, the remainder of the circumference being without the flange to provide an opening through which the strap 3 plays. This flange 19 embraces the rim of a cup-shaped cover member 20 which encloses the working parts of the device. The cover member 20 has an opening in register with that part of the base plate which lacks the flange, and the edges of the opening are curved back at the top 21 and along the sides 22—23 to prevent possible injury to the edges of the strap. The cover or shell 20 has a central hole which permits it to be passed over the stud 11 and another opening at 25 adjacent the central opening for inserting the locking pin 26 which will be described later.

Figure 3:
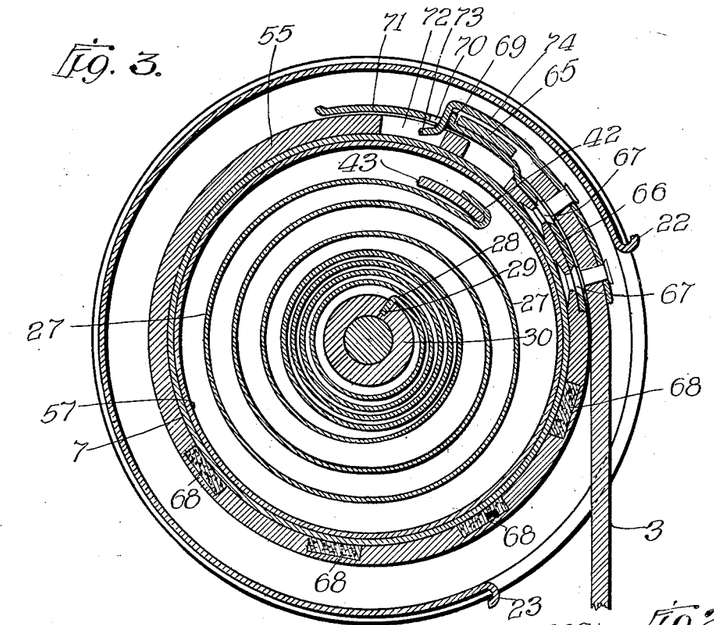
Fig. 3 is a cross-sectional view taken through the shock absorber on the line 3—3 of Fig. 6.
Figure 4:
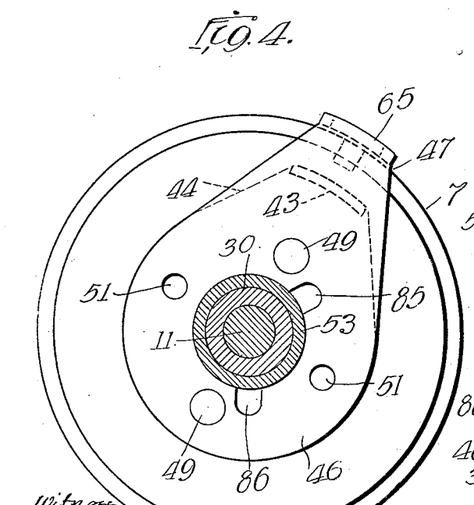
Fig. 4 is a cross-section taken on the line 4—4 of Fig. 6.

A retrieving spring 27 is mounted inside of the drum 7 and this retrieving spring has its inner end formed in the shape of a hook 28, as shown in Fig. 3, said hook extending into a slot 29 formed in the sleeve 30 of the spring anchor 31. This spring anchor comprises the sleeve 30 and a hollow hexagonal head 32 formed of a sheet metal stamping secured to the end of the sleeve in a novel manner. The sleeve 30 has an extending neck 33 (see Fig. 17) which extends through a hexagonal hole formed in the hollow head 32, and the metal of the neck is then beaded or riveted over as indicated at 34 and concentrated pressure, as by means of a series of fingers in a die, is brought upon the metal of the neck adjacent the corners of the hexagonal hole so as to force the metal firmly into the irregularities of the hole to key these two parts together. The hollow head 32 comprises a peripheral hexagonal flange 36 adapted to be embraced by a wrench and the web portion 37, which, as above explained, is joined to the neck of the sleeve 30. This web 37 has a series of openings 38 for the entry of the locking pin 26. The spring anchor 31 is adapted to be mounted on the pin or stud 11 and rotated thereupon to adjust the tension of the spring 27 and locked to said stud by means of the key member 40 (see Figs. 2, 8 and 9), which key is an oblong, rectangular plate preferably offset in the central portion so that it will be definitely pressed down against the web 37 of the hollow head 32 on spring anchor 31.

The outer end of the stud 11 is slabbed or milled off to give two parallel sides, and the key member 40 has an oblong opening therethrough closely embracing these parallel sides so as to prevent the rotation between the key and the stud. The hollow head member 32 is turned to the desired extent to tension the spring 27, and then the key member 40 is slipped axially over the splayed end 41 of the stud 11 inside the flange of the hollow head 32 fitting said flange relatively closely so as to prevent relative rotation between the head 32 and the key 40. The width of the key 40 is approximately equal to the internal hexagonal side with which it engages, and in length the key extends between two parallel sides of opposed flanges.

Figures 12, 13, 14, 15, 16, 17, 18, 19:
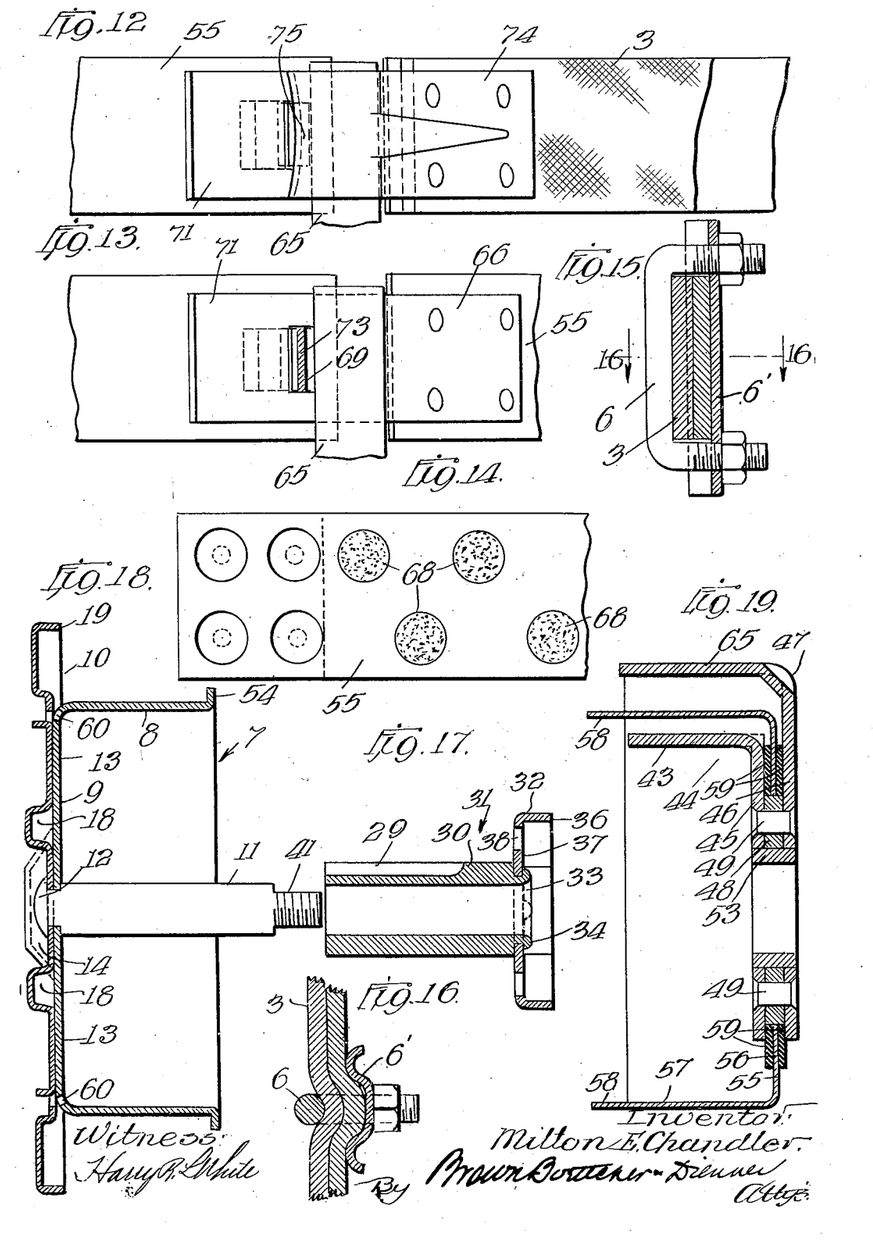
Fig. 12 is a developed view of the attachment of the strap to the arm and band, this view being taken on the line 12—12 of Fig. 2.
Fig. 13 is a developed section on the line 13—13 of Fig. 2.
Fig. 14 is a face view of one end of the band.
Fig. 15 shows the clamp for clamping the end of the strap to the axle.
Fig. 16 is a cross sectional view of the same taken on the line 16—16 of Fig. 15.
Fig. 17 is a longitudinal section through the adjusting sleeve for the inner end of the spring.
Fig. 18 is a vertical section through the drum and base plate showing the stud or pin in attached position.
Fig. 19 is an assembled view of the cover and the arms for attaching on the inside to the spring and on the outside to the strap and band.

The outer end of the spring 27 is provided with a hook 42 which is adapted to engage the inwardly extending portion 43 of the inner L-shaped arm 44, (see Fig. 19). The arm 44 has a central hub 45 which is joined to a similar hub 46 of the outer L-shaped arm 47. A connecting plate or ring 48 lies between the hubs 45 and 46, the hubs and the ring or plate being connected together, first, by the rivets 49 and, next, by means of offsets 50—50 punched in the hub 45 and like offsets 51—51 punched in the hub 46 extending into holes or recesses 52—52 formed in the plate 48 (see Figs. 5 and 9). These projections 50 and 51 are preferably formed by partially punching a slug out of the corresponding metal and they act as keys to key the hubs and connecting plate 48 together. The rivets 49, in turn, hold these parts rigidly in contact. The hubs 45, 46 and the intervening plate 48 have registering openings formed therethrough, and the common opening formed thereby is lined with a sleeve 53 of anti-friction material adapted to bear upon the cylindrical surface of the sleeve 30 between the slot 29 and the hollow head member 32.

The open edge of the drum member 7 is provided with a radially extending flange or rim 54 for restraining the friction band 55 in its travel about the periphery of the drum.

The open side of the drum member 7 is provided with a closure for housing the spring 27 and its connected parts, said housing 55 comprising a plate or end portion 56 and a cylindrical or barrel portion 57 which fits closely inside of the cylindrical or barrel portion 8 of the drum member 7. The cylindrical portion 57 is provided with extending lugs or ears 58—58 which are adapted to be passed through openings 60—60 formed in the bottom wall 9 of the drum 7 and in the base plate 10. These ears or lugs are then bent over to secure the cover member 55 in place.

The plate 55 has a central aperture which embraces the spacing plate 48 between the hubs 45 and 46 to form a substantially tight joint therewith, and fiber washers or rings 59—59 which fit relatively closely against the edge of the spacing plate 48 and lie on opposite sides of the rim of the opening in plate 56. By this means a relatively tight fit may be maintained between the stationary plate 56 and the rotating system comprising the L-shaped arms 44 and 47. In the process of manufacture the L-shaped arms with their spacing plate 48 between them are assembled, as shown in Fig. 19, in a sub-assembly. The spring anchor 31 with its hollow head is a separate sub-assembly and it is projected through the anti-friction liner 53 with a fiber washer 61 interposed, this fiber washer preventing friction between the hollow head member 32 and the outside part of the arm assembly, namely, the hub 46. A similar fiber plate 62 lies between the inner hub 45 and the spring 27. This disc 62 has a notch 63 at one part of the periphery to receive the arm 43 which is attached to the outer end of the spring 27.

A similar fiber plate 64 lies on the opposite side of the spring between the spring 27 and the bottom wall 13 of the drum member 7. The spring thus lies between two fiber plates and is enclosed in a water and dust proof casing which may be filled, or partially filled, with a lubricant.

The outer L-shaped arm 47 has a lateral extension 65 which is connected to the friction band 55 and to the pull strap 3 by a suitable connection such as shown in Fig. 3. The friction band 55 has riveted thereto at one end the sheet metal anchor clip 66 by means of rivets 67. The band 55 has graphite insert 68 which serves a dual purpose of providing a predetermined degree of lubrication to maintain the friction substantially constant under changes of temperature and wear, and also of preventing noise, such as squeaking or grunting, which would otherwise be produced by the frictional contact of the band 55 and the drum 7.

The anchor clip 66 has an ear 69 struck up from one edge of the opening 70, and this ear lies in advance of the arm portion 65 and, due to the tension of the spring 27, the arm 65 is always held against the ear 69. The opposite end of the friction band 55 lies under the extension 71 of the anchor clip 66 so as to keep the free end of the friction band from leaving the drum 7. An opening 72 is formed in the free end of the band 55 under the opening 70 in the anchor clip 66, and the nose 73 of the hook clip 74 extends through the opening 70 and into the opening 72 in the friction band so that the free end of the friction band can not escape from under the extension 71 of the anchor clip. Obviously, the end of the band 55 might be loosely coupled in any other desired manner to prevent the band from leaving the drum 7; but the means which I have shown is simple and permits the band 55, as it wears, to shrink and yet remain substantially in contact with the drum 7.

Preferably, the hook portion 73 of the hook clip 74 is curved, as shown at 75 in Fig. 12, so as to centralize the contact and provide relatively free adjustment of the hook to the ear 69 and thereby to the extension 65 of the arm 47.

By this construction, substantially the entire periphery of the friction band 55 is available to be applied to the surface of the cylindrical drum portion 8 to produce a variable friction in accordance with the displacement of the vehicle spring 5.

Figures 8, 9, 10, 11:
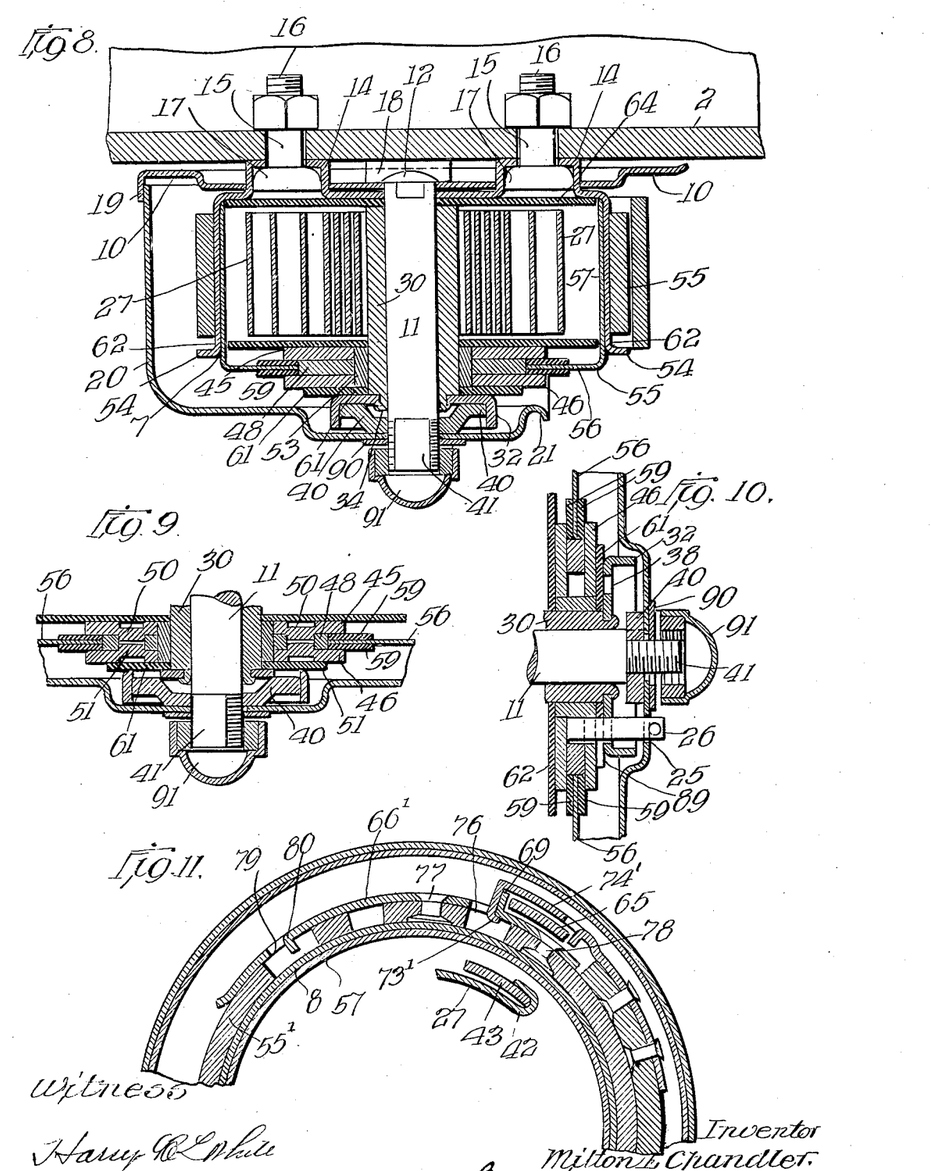
Fig. 8 is a horizontal cross-section taken on the line 8—8 showing the manner of applying the device to the frame of a vehicle; this section is taken on the line 8—8 of Fig. 2.
Fig. 9 is a section through the stud locking mechanism and the hubs of the arms, this view being taken on the section 9—9 of Fig. 2.
Fig. 10 is a fragmentary section similar to the view shown in Fig. 9 and illustrating the application of the locking pin to hold the spring under tension before the device is applied to the vehicle.
Fig. 11 is a vertical cross-sectional view showing a modified form of attachment between the strap, the outer arm and the friction band.

The mode of attachment of the retrieving spring to the friction band 55 and to the pull strap 3 may be varied, and I have shown a modified form of the same in Fig. 11, in which the hook clip 74' has the nose 73' turned under the lug or ear 69 and extends into a recess 76 formed in the end of the band 55', the attached end of the band being extended beyond the overlying portion 65 of the outer arm and riveted as indicated at 77 and 78 to the anchor clip 66'. The free end of the band 55' has a recess 79 into which there is projected an ear 80 struck down from the body of the anchor clip 66'. By this mode of attachment, the radial thickness of the overlying end of the strap 3 and the friction band 55' is reduced because it is not necessary to interpose the thickness of the anchor clip 66' between these parts in this modification. It is highly desirable to keep this radial thickness at a minimum at this point, since it determines the outer diameter of the active parts and, hence, the actual outer diameter of the device as a whole.

Figures 5, 20:
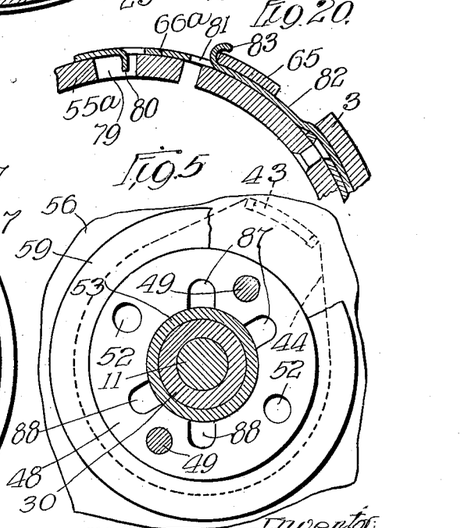
Fig. 5 is a fragmentary section taken on the line 5—5 of Fig. 6.
Fig. 20 is a fragmentary sectional view through the ends of the band showing a modified form of attachment for the strap.

In Fig. 20 I have shown another modification in which the anchor clip 66a has the central portion thereof cut out as indicated at 81, and a modified hook clip 82 narrow enough to lie within the recess 81 lies under the arm 65 and has a hook 83 engaging the front edge of said arm 65.

The free end of the friction band 55a is held under the outer end of the anchor clip 66a in the same manner as described in the previous embodiment of Fig. 11. The edges of the opening 81 on each side of the hook 83 hook over the arm 65, in turn with the hook 83, so that the anchor clip 66a and the hook 82 are connected to the arm 65 in parallel.

If desired, for convenience in assembling and manufacture, the inner arm member 44 may be provided with projecting fingers such as 43 spaced 120 degrees apart so as to hold the spring from expansion during assembly. Where this construction is employed, the fiber plate 62 is slotted to receive the fingers 43' (see Fig. 22), as it is shown slotted at 63 in Fig. 7, to receive the finger 43.

The hub 46 of the outer arm member 47 has two slots or openings 85 and 86 formed therein and the spacing plate 48, which lies between the hubs 45 and 46, has two pairs of openings 87—87 and 88—88 formed therein, and so disposed with respect to the recesses 52 and the holes for the rivets 49 that no matter on which side the plate 48 is turned, one of the openings 87 will lie in register with the opening 85 in the hub 46, and another of the openings 88 will lie in register with the opening 86 in the hub 46. These two slots 85 and 86 with the recesses below them are so placed that when the lever system is in the position indicated in Figs. 1, 2 and 3 for light loading of the vehicle, the locking pin 26 heretofore mentioned, is adapted to project through one of the openings 38 in the hollow head member 32 of the main spring anchor member 31 and through a slot 89 in the fiber plate 61 into one or the other of said recesses 85—86, depending upon whether the device is assembled for right or left assembly.

During assembly, the lever system is held stationary in a suitable fitting, and the spring anchor member is turned by means of a head 32 until the proper tension of the spring has been attained, whereupon the locking pin 26 is inserted through the opening 38 in the head member and extended into the recess formed by the slots 85 or 86 and their underlying slots or recesses 87 or 88. Since, thereby, both ends of the spring are locked together, the spring will not uncoil. The key member 40 is then applied, the cover member 51 is slipped over the end of the stud 11, and the special lock washer 90 is then laid over the cover 20 and the cap nut 91 screwed down upon the lock washer.

Figures 6, 7, 22:
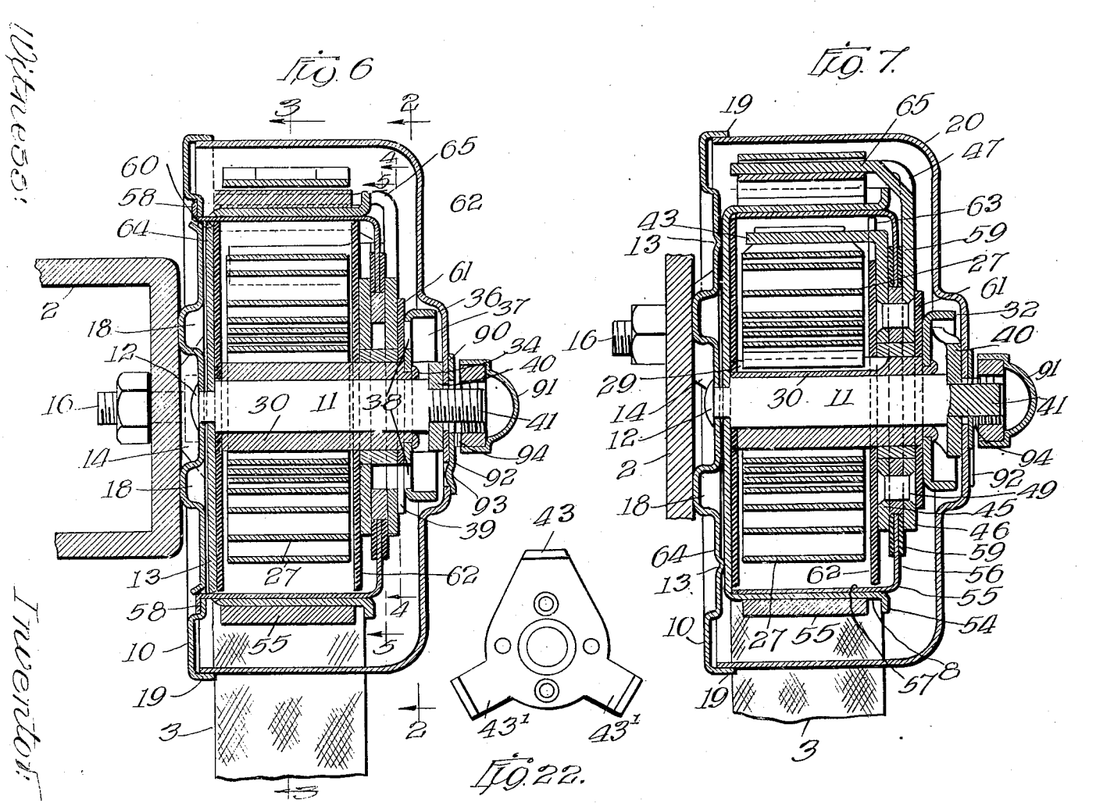
Fig. 6 is a vertical longitudinal section taken on the line 6—6 of Fig. 2.
Fig. 7 is a central cross-section taken on the line 7—7 of Fig. 2.
Fig. 22 is an elevation of a modified form of inner arm and spring retainer.

This lock washer has suitable spring fingers extending up in contact with the cap nut 91, as shown at 94 in Figs. 6 and 7, and it has also an extending ear 92 with a rounded depression 93 therein adapted, after the locking pin 26 has been removed from the opening 25 in the cover member 20, to be turned into position where the depression 93 drops into the opening and be then held in place and at the same time lock the cap nut 91 against removal.

The operation of the device thus far described is as follows:—

The device, as assembled with the spring under suitable tension, is clamped to the frame either by bolting, as indicated in Fig. 8, or by the attachment thereto through the intermediary of a bracket plate or the like. The cover member 20 may be freely removed or applied without disturbing the locking pin 26. The strap, which may be shipped separately or which may be assembled in place with the cover 20 on the device, is attached to the axle or the bracket or eye which is connected thereto and clamped by means of the clamping bolt 6 and clip 6', whereupon the pin 26 may be withdrawn, the ear or extension 92 on the washer 90 being then turned over the opening 25 and the cap screw 91 turned down tight.

Thus drawing up the cap screw 91 presses down upon the central part of the cover 20 holding it against the raised central part of the key 40, the ends of the key in turn passing upon the web 37 of the hollow head member 32 clamping the bottom of the sleeve 30 against the fiber plate 64 and against the end wall 9 of the drum member 7 and the base plate 10 to which the stud 11 is secured.

The parts are normally in the position shown in Figs. 1 and 2 when the vehicle is in normal position. If, by a road irregularity the spring 5 is compressed, its recoil tends to throw the frame 2 upwardly. The extent of deflection of the main spring 5 corresponds to the degree of wrapping of the strap 3 about the periphery of the drum by the take-up mechanism, so that, upon the beginning of recoil movement, the amount of friction which is opposed to recoil is suitably proportioned to the force which is acting to produce recoil. The amount of friction is so proportioned that the recoil of the spring 5 is permitted at a rate as rapid as is consistent with the comfort of the occupants of the vehicle.

The amount of resistance which is offered to dropping of the axle 4, as for example, due to a hole in the roadway, is not very great, but it is present in some degree, and this may be regulated by the initial position of the arm 47.

The pressure of the strap 3 comes upon the band 55 to the extent to which the strap is wrapped upon the drum, the band intervening. Since the band and strap are borne on the exterior surface of the drum and held between the flange 54 and the back plate 10 and there is sufficient space to permit these parts to move radially where they are attached to the lever system, no substantial stress comes upon the lever system other than the transmission of the spring pressure. It will be noted that the two arms 44 and 47 are in alignment with each other on the same side of the trunnion which is formed on the stud 11, and therefore the bearing on said trunnion has a minimum stress thereupon with the result that very little wear is encountered on this trunnion, and the trunnion and the joint which is formed with the cover 56, remains tight, even after long continued use. Hence, the oil which may be contained within the drum and which is employed to lubricate the spring, does not come upon the bearing surface on the drum to vary the friction.

By loosely holding the friction band 55 and permitting the strap 3 to play directly upon the same, the change in friction, due to the proportional degree of wrapping, is a maximum. I am familiar with devices in the prior art in which a similar friction band has been held in place by a spring backing, and I find that, due to such spring applying the friction to the drum, there is a constant drag which must be compensated for an increased tension in the retrieving spring. This tension of the retrieving spring opposes the main spring 5 and is undesirable since it corresponds to a constant upward pull on the axle 4 towards the frame 2, preventing the free descent of the axle when the wheel drops into a hole and making the device more stiff and less responsive to the variations in position.

If it is desired to change the spring tension, all that is required is to loosen the cap nut 91 and take off the cover, whereupon a wrench may be applied to the hollow head 32 and the key 40 lifted out of the way, whereupon the spring anchor may be turned to the desired position and the key again inserted.

I do not wish to be limited to the specific form of the head and key for tying the head through the key to the stud 11, as obviously this may be varied within the spirit and scope of my invention.

The friction band 55 is preferably made of a fabric and rubber composition with the solid graphite inserts 68 disposed in depressions or holes therein moulded in the process of manufacture. This friction band 55 does not require much tensile strength, and, hence, the molded strip or band is sufficient.

It is to be noted that I do not employ a backing spring for the band 55. I have found that where such spring or metal backing is employed a much greater tension on the take-up spring is required to retrieve the band and strap for equal application of the friction. My device therefore gives greater freedom to the main springs 5 and better graduation of the friction to the spring recoil and longer life.

Figure 23:
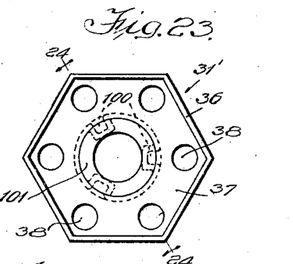
Fig. 23 is an end view of a modified form of spring anchor sleeve.
Figure 24:
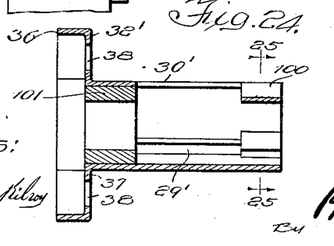
Fig. 24 is a longitudinal section of the same taken on the line 24—24.
Figure 25:
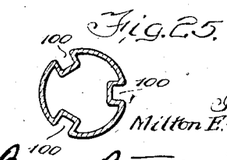
Fig. 25 is a transverse section taken on the line 25—25 of Fig. 24.
Figure 26:
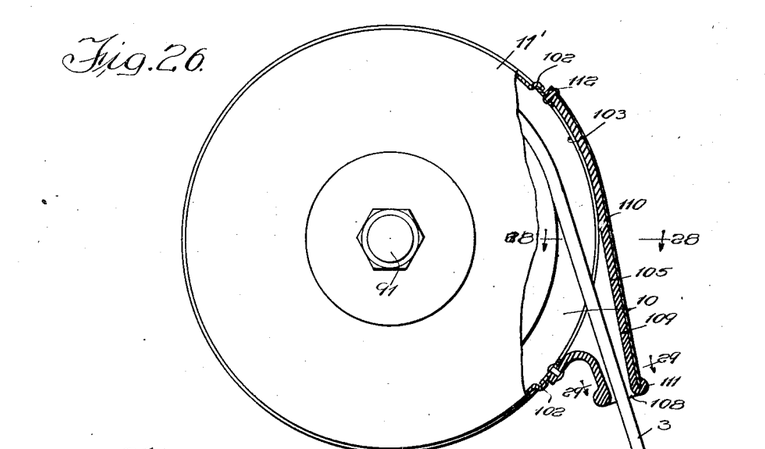
Fig. 26 is a front elevational view showing a form of the boot for closing the opening through which the strap plays.
Figure 27:
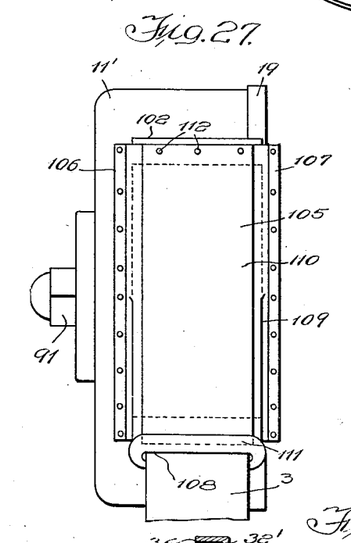
Fig. 27 is a side view of the same taken from the right of Fig. 26.

In Figs. 23 to 25, inclusive, I have shown a modified form of spring anchor 31' which is formed of a sheet metal stamping. In this case the head 32' is formed integral with the body or sleeve portion 30' and it has the integral hexagonal flange 36 and web 37 pierced by the holes 38, as in the form shown in Fig. 17. The inner end of the sleeve portion 30' is crimped in to provide three points of bearing, as indicated at 100. These crimped portions bearing against the stud 11 adjacent its inner end. At the outer end of the sleeve 30' adjacent the web 37, I insert a bushing 101 preferably of impregnated wood to provide a bearing between the sleeve 30' and the outer portion of the stud 11. This outer end cannot be crimped in satisfactorily as can the inner end, because of its attachment to the web 37 and, furthermore, because this portion of the sleeve must provide a bearing for the moving lever system and its bearing bushing 53.

The sleeve portion 30 is slotted, as indicated at 29' to receive the inner hooked end of the main spring 27. This slot 29' is preferably formed in alignment with one of the crimps 100 so that the circumferential or hoop strength of the sheet metal sleeve is not destroyed at the inner end.

Figure 28:
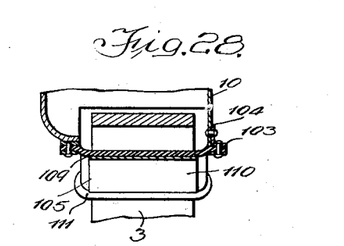
Fig. 28 is a section taken on the line 28—28 of Fig. 26.
Figure 29:
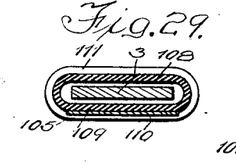
Fig. 29 is a similar section taken on the line 29—29 of Fig. 26.

In Figs. 26 to 29, I have shown a flexible boot for protecting the device against the entry of dirt, water and the like. In this case the cover member 11' is provided with overhanging flanges 102 to receive within them the edges of a plate 103. This plate is cut away at the central portion to provide merely a generally rectangular frame, bent, however, to the cylindrical shape of the periphery of the housing 11. At its rear edge, this plate 103 has a flange 104 fitting flat against the peripheral margin of the back plate 10. The flange 104, which is struck up along the edge of the opening in said rectangular plate 103, is riveted to the margin of the back plate 10, as indicated in Fig. 28, so that the plate 103, with its attached parts, becomes a part of the back frame plate 10. The flexible boot 103 preferably formed of molded rubber, has attaching flanges along its edges riveted or otherwise secured to the margins of the plate 103. Suitable binding strips 106 and 107 are employed along the front and back edges of the shoe 105 to secure these parts together. The boot is preferably made of relatively soft flexible rubber, and it has a generally rectangular opening 108 through which the pull strap 3 passes. The boot forms a tubular extension 109 which effectively limits the entry of foreign matter into the shock absorber. The tubular extension 109 embraces the pull strap 3 loosely, but, being flexible, it tends to follow the strap in case of lateral deflection of the same, as may be the case in certain mounting of the device where the strap 3 is not directly in the line of movement of the frame and axle with respect to each other.

The boot 105 being of relatively soft flexible rubber might be pulled inwardly, in case of irregularities or roughness on the web 3, and to prevent this I provide a metal reenforcing strip 110 which may be made of spring steel, brass, or the like, the front end being embedded in the bead 111 about the opening 108, and the rear end of the spring reenforcement 110 being secured as by rivets 112 to the upper margin of the boot 105 and the upper margin of the plate 103. The cover member 11' may be removed from the device for the purpose of adjusting spring tension or any other purpose, by loosening the nut 91 and pulling the cover out in the direction of the length of the stud 11, the margins of the plate 103 and the flanges 102 guiding the cover off and on. When the cover is removed, the plate 103 retains its normal position, being secured to the back frame plate 10. Obviously, the spring reenforcement 110 might be moulded in place within the body of the boot.

The device is shown as made mainly of stampings, but it will be apparent that this is optional. I do not intend to be limited to the details shown and described except as they are specifically recited in the appended claims.

I claim:—

1. In combination, a drum, a strap wrapped to a variable extent about the periphery of the drum, a take-up spring within the drum, an inner arm connected to the spring, and an outer arm connected to the strap, both lying on the outside of the spring, and a cover plate for the drum disposed between said arms and enclosing the spring.

2. In combination, a drum, a strap wrapped to a variable degree about the periphery of the drum, a take-up spring within the drum, a fixed central stud in the drum, an inner arm connected to the spring, an outer arm connected to the strap, said arms having hubs connected together and bearing upon the pin, and a cover plate for the drum disposed between said arms and enclosing the spring.

3. In combination, a drum, a strap wrapped to a variable degree about the periphery of the drum, a take-up spring within the drum, an inner arm connected to the spring, an outer arm connected to the strap both lying on the outside of the spring, a cover plate for the drum lying between said arms, a movable spring anchor having means exterior to the cover plate for adjusting the tension of said spring.

4. In combination, a drum, a strap wrapped to a variable degree about the periphery of the drum, a take-up spring within the drum, a stud mounted centrally of the drum, an inner arm connected to the spring, an outer arm connected to said strap, said arms having hubs connected together, a cover plate lying between said arms, said stud extending out through said hubs.

5. In combination, a drum having a cover therefor forming a closed housing, a spring disposed within and enclosed by said housing, an inner arm connected to the end of the spring, a strap adapted to be wrapped to a variable extent about the periphery of said drum, an outer arm connected to said strap, said arms at their pivot ends being connected together, and a movable spring anchor for the inner end of the spring, said anchor having means external of the housing for adjusting the tension of the spring.

6. In combination, a drum having a cover cooperating therewith and forming a closed spring housing, a take-up spring within the housing, an inner arm connected to the active end of the spring, a strap adapted to be wrapped about the periphery of the drum, an outer arm connected to the strap, said arms at their pivot ends being rigidly connected together and lying in substantially the same radial plane, and means independent of the position of said arms for adjusting the tension of the anchor end of said spring.

7. In combination, a drum having a cover forming therewith a closed spring housing, a take-up spring in said housing, an arm within the housing connected to the outer end of the spring, a strap adapted to be wrapped to a variable extent about said drum, an arm external of the housing connected to the strap, said arms being permanently and rigidly interconnected, a rotatable member extending into the drum and forming an adjustable spring anchor for the inner end of the spring.

8. In combination, a base plate having a plurality of apertures, a drum having a head, said head having depressions extending through said apertures, said depressions having apertures, mounting pins having shanks extending through the apertures in the depressions and having heads lying in said depressions, and a pin mounted centrally of said drum and securing said drum and plate together.

9. In combination, a base plate having a plurality of apertures, a drum having a head, said head having depressions extending through said apertures, said depressions having apertures, mounting pins having shanks extending through the apertures in the depressions and having heads lying in said depressions, and a pin mounted centrally of said drum and securing said drum and plate together, said plate having independent projections, the bases of which are adapted to lie flush with the bases of the projections on said head.

10. In combination, a base plate having a plurality of apertures, a drum having a head, said head having depressions extending through said apertures, said depressions having apertures, mounting pins having shanks extending through the apertures in the depressions and having heads lying in said depressions, and a pin mounted centrally of said drum and securing said drum and plate together, said head and plate having registering apertures, a cup-shaped spring cover member having prongs projecting through said registering apertures and securing said cover member in place.

11. In combination, a drum member having an axial stud, a spring disposed in the drum member, a spring anchor member rotatably mounted on said stud, a head for turning said anchor member for adjusting the spring, and means engaging the head and the stud and being locked against rotation with respect to both the head and the stud.

12. In combination, a drum member having an axial stud, a spring disposed in the drum, a strap adapted to be wrapped to variable extent on said drum, lever means connecting said spring to said strap, a sleeve disposed on said stud and forming a spring anchor for said spring, said lever means having a bearing upon said sleeve, a head upon said sleeve, a key member locked against rotation but axially adjustable on said stud and adapted to grip said head, and a nut threaded upon said stud and holding said key member in engagement with said head.

13. In combination, a drum member having a central stud, a sleeve on said stud, a spring anchored to said sleeve, a strap wrapped about said drum to a variable extent by said spring, said sleeve having a polygonal head, the end of the stud having its sides slabbed off, a key member comprising a bar having an oblong aperture for embracing the end of the stud and adapted to engage the polygonal sides of said head to hold the same against turning.

14. A spring anchor comprising a sleeve, having a slot in its outer cylindrical surface to be engaged by the anchor end of a spiral spring, a flanged plate secured to the end of said sleeve, said flange being polygonal and forming a hollow polygonal cylinder having internal shoulders adapted to be engaged by an oblong key member.

15. In combination, drum member having a central stud, a sleeve on said stud, said sleeve having a slot adjacent its inner end for receiving the anchor end of a spiral spring, a spring anchored in said slot, a strap adapted to be wrapped about said drum to a variable extent by said spring, a flanged plate secured to the outer end of said sleeve, said flange being polygonal, the end of the stud being slabbed off, a key member comprising a bar having an oblong aperture embracing the slabbed end of said stud, and having its end engaging the polygonal flange.

16. In combination, a drum member having a central stud, a sleeve on said stud, said sleeve having a slot adjacent its inner end for receiving the anchor end of a spiral spring, a spring anchored in said slot, a strap adapted to be wrapped about said drum to a variable extent by said spring, a flanged plate secured to the outer end of said sleeve, said flange being polygonal, the end of the stud being slabbed off, a key member comprising a bar having an oblong aperture embracing the slabbed end of said stud, and having its ends engaging the polygonal flange, a cover having an opening to receive said stud and engaging said key member and means mounted in the end of the stud to hold the cover in place.

17. In combination, a base plate having a flange, a drum having a head lying against said plate, a stud securing said plate and drum together, a strap wrapped to a variable extent about said drum, a spring within the drum and having its outer end connected to said strap, a sleeve on said stud having a slot forming an anchor for the inner end of the spring, a polygonal head for said sleeve, the end of the stud being threaded and having its sides slabbed off, a key plate having an oblong aperture to receive the end of the stud, said plate being adapted to engage the polygonal sides of said head to prevent turning of the same, a cup-shaped cover member having its rim cooperating with said flange and having a hole in its bottom part to fit over the stud, and a nut threaded onto the end of the stud to hold the cover member and the key plate in place.

18. In combination, a base plate, a drum having a head lying against said plate, a stud extending through said plate and drum and securing them together, a strap wrapped to a variable extent about said drum, a spring within the drum, a sleeve on said stud secured to the inner end of said spring, a spring cover member closing the open side of said drum, an inner arm connected to the active end of said spring, an outer arm connected to said strap, said spring cover lying between said arms, said arms having hubs connected together and bearing upon said sleeve, said sleeve having an external head of polygonal form, the end of the stud projecting beyond said head and being slabbed off and threaded, a key member non-rotatably mounted on said slabbed end of the stud and engaging said polygonal head to keep the same from turning, a cup-shaped cover member extending to said base plate and having an aperture for receiving the end of said stud and a nut for holding said cover member and key member in place.

19. In a device of the class described, the combination of a cup-shaped spring housing having an aperture in the bottom thereof, a stud projecting loosely through said aperture, an inner arm having a hub larger than said aperture, an outer arm having a hub larger than said aperture, a plate substantially fitting said aperture and lying between and secured to said hubs, and a bearing sleeve for said hubs and plate to provide a bearing for them upon said stud.

20. In combination, a cup-shaped spring housing having an aperture through the bottom thereof, an inner L-shaped arm having a hub, an outer L-shaped arm having a like hub, a circular plate lying between said hubs and filling said aperture, said hubs and said intervening plate having means connecting them together and having a common central aperture for a bearing and a bearing in said aperture.

21. In combination, a cup-shaped spring housing having an aperture through the bottom thereof, an inner L-shaped arm having a hub, an outer L-shaped arm having a like hub, a circular plate lying between said hubs and filling said aperture, said hubs and said intervening plate having means connecting them together and having a common central aperture for a bearing and a bearing in said aperture, said plate being thicker than the edges of said apertured bottom, and fiber plates lying between said hubs and the bottom of said housing.

22. In combination, a drum, a strap adapted to be wrapped to a variable extent about said drum, an L-shaped arm having one portion thereof extending parallel to the axis of the drum and overlying the periphery of the drum, a friction band lying under said strap, a clip secured to one end of said band and overlying the other end of said band, a spring in the drum and connected to said arm, a lug struck up from said clip and lying on the forward side of said one portion of said drum, and a hook on the end of the strap projecting through said clip and engaging said lug.

23. In combination, a stationary drum, a spring within the drum, a central stud in the drum, an anchor sleeve on the stud secured to the inner end of the spring, a pair of L-shaped arms, one lying inside the drum and the other lying outside the drum, said arms having hubs connected together and having a common bearing on said sleeve, and a cover for the drum lying between said arms.

24. In combination, a drum, a take-up spring within the drum, a friction band on the drum, an arm connected to the spring and having a portion lying adjacent the band, an anchor clip on the band, said clip having a lug extending in front of the adjacent portion of the arm, a pull strap lying outside the band and a hook for the end of the band, said hook extending over said lug and said portion of the arm, said spring urging said portion of the arm into contact with the lug, and said lug into contact with the hook.

25. In a shock absorber, a frame plate, a drum thereupon, a strap trained over the drum, a cover engaging the frame plate, said cover having an opening for the strap and a boot covering said opening, said boot comprising a tubular flexible member having flanges secured to the frame plate about the edges of the cover and having a restricted outlet, said strap passing freely through the restricted outlet of the tubular extension.

26. In combination, a curved rectangular frame, a flexible boot having flanges engaging said frame and a tubular extension, and a flat reenforcing spring connected to the tubular extension longitudinally thereof to stiffen the same endwise, but permitting lateral movement thereof.

27. A boot for shock absorbers of the strap type comprising a hollow body of rubber of generally trumpet shape and consisting of a flanged mouth adapted to be secured to the sides of a cover member, and a body tapering down to a neck and having an outlet of a size and shape to fit closely about a tension member, and a flat reenforcing spring secured along the side of the body to stiffen the same endwise and to hold the hollow body in open position for the passage of a tension member.

28. A spring anchor comprising a tubular sleeve having longitudinal corrugations along a portion of its length, an integral hollow flanged polygonal head and a circular cylindrical portion intermediate the head and the corrugated portion, said anchor being of substantially uniform thickness throughout.

29. In combination, a drum member having a central stud, a sleeve on said stud, said sleeve having a slot adjacent its inner end for receiving the anchor end of a spiral spring, a spring anchored in said slot, a strap adapted to be wrapped about said drum to a variable extent by said spring, a flanged plate secured to the outer ends of said sleeve, said flange being polygonal, and a key member comprising a bar having its ends engaging the polygonal flange and having an aperture fitting over the end of the stud, said end of the stud and the apertured part of the bar having cooperating splined shoulders to permit relative longitudinal motion but preventing relative rotary motion.

In witness whereof, I hereunto subscribe my name this 2nd day of April, 1927.

MILTON E. CHANDLER.